April 5, 1949.    C. O. SLEMMONS    2,466,495
BAND AND PULLEY-CLUTCH ASSEMBLY
Filed May 15, 1946
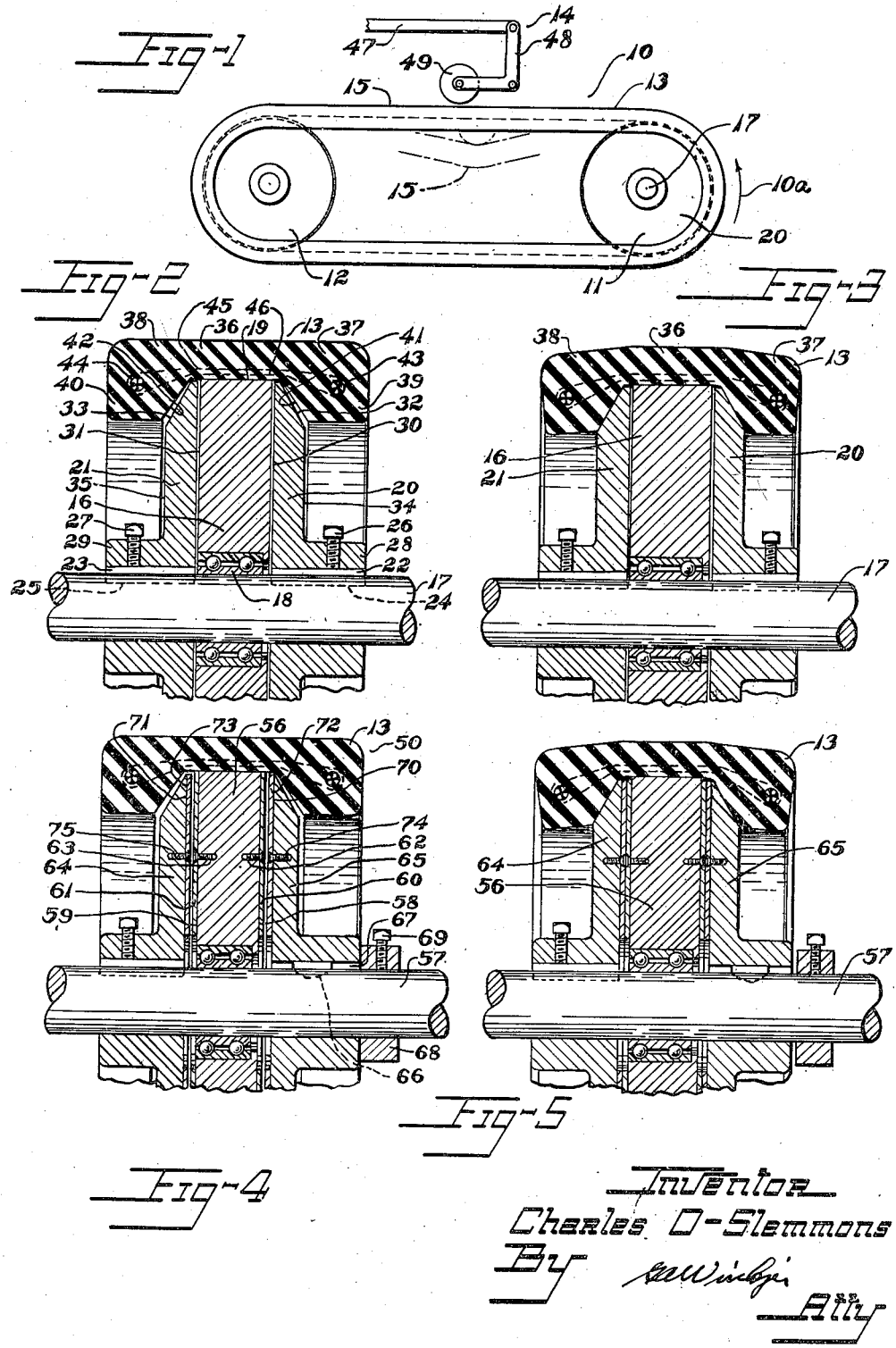
Inventor
Charles O. Slemmons Patented Apr. 5, 1949

2,466,495

UNITED STATES PATENT OFFICE 2,466,495

BAND AND PULLEY-CLUTCH ASSEMBLY

Charles O. Slemmons, South Bend, Ind., assignor to The B. F. Goodrich Company, New York, N. Y., a corporation of New York Application May 15, 1946, Serial No. 669,871

18 Claims. (Cl. 74—230.24)

The invention relates to band and pulley assemblies and especially to band and pulley assemblies having frictional clutch-engagement for transmission purposes such, for example, as in belt and pulley drives, and band-track and pulley assemblies for self-laying track type vehicles.

Objects of the invention are to provide an improved band and pulley assembly for frictional clutch-engagement; to provide for picking up the load on the assembly gradually and smoothly; to provide for engaging an overlying band part with a side clutch surface of the pulley by tensioning the band on the pulley; to provide for effecting the clutching action with a minimum of operating parts of the band and pulley assembly; and to provide for simplicity and durability of construction, convenience of manufacture, assembly and servicing, and for effectiveness and reliability of operation.

These and other objects and advantages of the invention will be apparent from the following description.

In the accompanying drawings, which form a part of this specification and in which like numerals are employed to designate like parts throughout the same, Fig. 1 is a side elevation of a band and pulley-clutch assembly constructed in accordance with and embodying the invention, broken lines shown beneath the upper reach of the band indicating the band in a tensioned condition for driving and clutching purposes, Fig. 2 is a sectional view of the band and a pulley with the clutch surfaces in free-running relation, Fig. 3 is a view like Fig. 2 with the band and pulley clutch surfaces engaged, Fig. 4 is a sectional view showing a modified construction of the band and pulley with the clutch surfaces in free-running relation, and Fig. 5 is a view like Fig. 4 but showing the parts thereof in driving relation.

In the illustrative embodiment of the invention shown especially in Figs. 1 to 3 inclusive, the construction of a band and pulley clutch assembly 10 includes a pair of spaced-apart pulley structures 11, 12, a flexible band 13 wrapped about the pulleys, and tensioning means 14 suitably mounted such, for example, as at the upper reach 15 of the band 13. The arrangement is adapted for use as a belt and pulley drive, or for use as a band-track and pulley clutch assembly for self-laying track type vehicles, or for other related transmission purposes.

Either or both pulley structures 11, 12 may be provided with similar clutch construction in accordance with the invention; and for descriptive purposes the construction of the pulley structure 11 only need be described in detail. The pulley structure 11 for the arrangement shown may be considered as the driving pulley rotating in the direction indicated by the arrow at 10a. The pulley structure 11 includes an idler element 16 of strong material such, for example, as steel, aluminum alloy, plastic, or other suitable material, mounted for free rotation on a shaft or other inner supporting structure 17, and being so mounted thereon as by a ball bearing 18 or other suitable bearing means. The idler element 16 has a peripheral surface 19 about which the band 13 is wrapped in contact with and riding on the peripheral surface 19 at all times along a circumferentially extending peripheral zone of the latter.

The pulley structure 11 also includes a pair of driving plate elements 20, 21 which may be of disk-like form supported fixedly upon the shaft or inner supporting structure 17 as by keys 22, 23 and keyways 24, 25 and set screws 26, 27 at hub portions 28, 29 of the driving plate elements. The driving plate elements 20, 21 are disposed closely adjacent opposite side faces 30, 31 of the idler element 16 and are provided with annular side clutch surfaces 32, 33 at their exterior side faces 34, 35, which annular side clutch surfaces may be bevelled as shown and are located at the region of the rims of the driving plate elements, as shown especially in Figs. 2 and 3.

The annular clutch surfaces may be of the bare metal of which the driving plate elements are made or may be suitably roughened or faced with a frictional-clutch material.

The pulley structure 11 arrangement provides a compact pulley-clutch construction having free rotation of the idler element 16 relative to the shaft 17 and permits relatively free rotating movement of the idler element and the band with respect to the shaft. In addition to this feature, the pulley-clutch construction facilitates frictional engagement of the band 13 with the annular clutch surfaces 32, 33 under tensioning of the band by the tensioning means 14, which advantageously promotes picking up the load on the assembly 10 gradually and smoothly and without creating objectionable stresses in the driving mechanism including the respective parts of the pulley structure.

For coacting with the pulley structure 11 in providing the desired clutch action, the band 13 of flexible material such, for example, as resilient rubber or other rubber-like material, has a recessed inner face to receive the pulley structure and includes a central portion 36 extending circumferentially of the band and having the inner face of the portion 36 separated from the driving plate elements but in contact with the peripheral surface 19 of the idler element 16 along the wrapped extent of the band. The band includes laterally spaced-apart, circumferentially extending overlying portions 37, 38 in continuation of and interconnected by the central portion 36, which overlying portions 37, 38 also project radially inward at the inner face of the band providing circumferential ribs 39, 40 defining the sidewalls of the recess and being in overlying relation with the annular side clutch surfaces 32, 33 of the driving plate elements. The ribs 39, 40 have inner driving or clutch surfaces 41, 42, laterally spaced-apart and facing toward each other and normally overlying the clutch surfaces 32, 33 in spaced relation thereto for the free-running condition of the assembly 10, as shown especially in Fig. 2.

The flexible band 13 is provided with substantially inextensible tension elements 43, 44 which may be stranded cables of suitable metal material embedded in the rubber-like material of the ribs 39, 40 at positions laterally outward of the clutch surfaces 41, 42 respectively; tension-resisting material comprising one or more layers 45, 46 of relatively non-stretchable material such, for example, as cords or woven textile fabric are embedded in the rubber-like material of the band and wrapped about and joining the cables 43, 44 for reinforcing the band 13. The fabric layers joining the cables resist lateral spreading of the cables and compel the cables to urge the clutch surfaces of the band toward each other and against the side clutch surfaces of the driving plate elements under the tendency of the cables to move inward radially of the pulley structure when tensioned thereon.

For transmission purposes the tensioning means 14 including link 47, bell crank 48 and roller 49 may be operated so that the roller 49 moves downwardly. Thus the upper reach 15 of the band 13 may be depressed as shown by the broken lines in Fig. 1, thereby tensioning the band about the pulley structures 11 and 12. This tensioning action alters the free-running relation of the band 13 and the idler element 16 with respect to the driving plate elements 20, 21, as shown especially in Fig. 2, to the driving relation as shown especially in Fig. 3.

At the entry and exit of the tensioned band on the pulley structure no scuffing of the overhanging portions at the clutch surfaces will occur during the moving of the overhanging portions to and from their overlying relation with the annular clutch surfaces of the driving plate elements. The radial forces due to driving pulley torque and radial forces due to band tension acting through the cables and tension-resisting fabric layers of the band compel the overlying portions 37, 38 to flex generally radially inward and toward each other forcing the clutch surfaces 41, 42 into engagement with the side clutch surfaces 32, 33 of the driving plate elements.

The driving torque or force is transmitted through the driving plate elements to the band 13 at the laterally spaced-apart clutch surface regions of the latter by virtue of the gripping action of the band on the driving plate elements and the engagement of the respective clutch surfaces. The driving torque is transmitted through the overlying portions 37, 38 to the central portion 36 and hence throughout the lateral and circumferential extent of the band, especially at the wrapped extent of the latter, providing driving engagement with little or no slippage despite relatively severe loading of the band.

The modified construction 50 of the band and pulley clutch assembly, shown especially in Figs. 4 and 5, is substantially like that of the assembly 10 except as described hereinafter.

The idler element 56 in addition to being freely rotatable with respect to the shaft or inner supporting structure 57 is also mounted to permit axially slidable movement. The opposite side faces 58, 59 of the idler element are provided with annular rings 60, 61 of friction material such, for example, as molded asbestos or woven asbestos fabric or other suitable material for clutch purposes, the annular rings being secured thereto as by suitable circumferentially spaced-apart screw fasteners 62, 63 or by a suitable adhesive or both and providing side clutch surfaces on the idler element.

The driving plate element 64 is suitably fixedly mounted on the inner supporting structure 57, while the other driving plate element 65 is mounted in an axially slidable manner on the inner supporting structure as by a sliding key 66 and keyway 67 arrangement in combination with a collar 68 fixedly secured on such structure as by a suitable set screw 69. The collar limits the sliding movement of the driving plate element 65 in the axial direction away from the idler element. The inner side faces 70, 71 of the driving plate elements are also provided with annular rings 72, 73 corresponding to the annular rings 60, 61 and of suitable friction material, the rings 72, 73 being attached to the driving plate elements as by suitable circumferentially spaced-apart screw fasteners 74, 75 or by a suitable adhesive or both and providing interior side clutch surfaces on the driving plate elements.

In the operation of the modified construction 50 with the pulley structure and band in the freely running condition, shown especially in Fig. 4, the band 13 and idler element 56 rotate about the shaft 57. Applying tension to the band by the tensioning means 14 causes flexing of the band and the coaction of the cables and fabric layers providing the desired hinging action of the overlying portions of the band urges the clutch surfaces of the band toward each other and against the side clutch surfaces of the driving plate elements under the tendency of the cables to move inward radially of the pulley structure. The flexing of the tensioned band not only presses the clutch surfaces of the band into engagement with the side clutch surfaces of the driving plate elements 64, 65 but coincidentally urges the slidable idler element 56 and driving plate element 65 in the axial direction toward the fixed driving plate element 64 bringing the respective annular rings 60, 61 and 72, 73 into clutching engagement.

This engaging action in effect provides a united relation of the driving plate elements and the idler element assuring rotation of the pulley structure as a substantially integral driving pulley. The pulley structure in the engaged condition thereof operates to transmit the driving force or torque from the shaft 57 to the band at the peripheral wrapped zone of the latter continuously along the engaged extent of the respective clutch surfaces of the overlying portions of the band and driving plate elements and the engaged peripheral surface of the idler element. This continuity of transmission of force, especially laterally of the band avoids objectionable localized stresses in the band while at the same time effectively transmitting the desired load to the band with little or no slippage.

A further advantage of the modified construction 50 is that by virtue of the unitary relationship of the respective parts of the pulley structure in the engaged condition of the latter, as shown especially in Fig. 5, there is provided a relatively greater driving area of the pulley structure surface in engagement with the band, thereby increasing the ability of the band and pulley-clutch assembly 50 to transmit a relatively high load before objectionable slippage occurs.

While in the constructions hereinabove described, the center element of the pulley is mounted for idling movement upon the shaft and the end plate elements are keyed to the shaft, other arrangements may be provided, if desired. For example, the center element may be keyed to the shaft and the end elements mounted for rotation with respect to the shaft with at least one of the end elements mounted for axial sliding movement to effect a clutching action with the center element under axial pressure by the tightened band. Again, instead of utilizing the center element as a support for the band when running slack, the center element may be of such reduced diameter as to be out of contact with the band at all times and serve in a spacing and clutching capacity between the end elements having the side clutch surfaces at the exterior faces thereof.

Variations may be made without departing from the scope of the invention as it is defined in the following claims.

I claim:

1. A band and pulley clutch assembly comprising a pulley structure having axially aligned and axially separated relatively rotatable parts in the disengaged condition of the clutch, one of said parts presenting a clutch surface at an exterior side of the pulley structure, a band of flexible material on said parts of the pulley structure and having an overlying portion adjacent said clutch surface, and means for tensioning said band on said parts of the pulley structure to force a surface of said overlying portion of the band in the axial direction into driving engagement with the side clutch surface of the pulley structure to compel rotation of said parts thereof together.

2. A band and pulley clutch assembly comprising a pulley structure having a pair of axially aligned and axially separated band-engaging parts, said parts presenting axially spaced-apart clutch surfaces facing away from each other at exterior sides of the pulley structure and said pulley structure having a third part between said pair of band-engaging parts mounted for idling rotation relative to the latter, a band of flexible material on said parts of the pulley structure and having axially spaced-apart surfaces facing each other and adapted to coact with the side clutch surfaces of the band-engaging pulley parts, and means for tensioning said band on the pulley structure parts to force said surfaces of the band into driving engagement with said side clutch surfaces to compel rotation of said parts of said pulley structure together.

3. A band and pulley clutch assembly comprising a pulley structure including an idler element having a peripheral surface, an inner supporting structure on which said idler element is freely rotatable, a driving plate element supported upon said inner supporting structure adjacent said idler element, said driving plate element having a clutch surface at an exterior side face thereof, a band of flexible material wrapped about said peripheral surface of the idler element and including a portion in overlying relation with the side clutch surface of the driving plate element, and means for tensioning said band and flexing the overlying portion thereof in the axial direction into engagement with said side clutch surface.

4. A band and pulley clutch assembly comprising a pulley structure including an idler element having a peripheral surface, an inner supporting structure on which said idler element is freely rotatable, a pair of driving plate elements supported upon said inner supporting structure each adjacent an opposite face of said idler element and each having an annular clutch surface at an exterior side face thereof, a band of flexible material wrapped partially about said peripheral surface of the idler element and including laterally spaced-apart portions in overlying relation with the side clutch surfaces of said driving plate elements, and means for tensioning said band and flexing the overlying portions thereof into engagement with said side clutch surfaces.

5. A band and pulley clutch assembly comprising a pulley structure including an idler element having a peripheral surface, an inner supporting structure on which said idler element is freely rotatable, a pair of driving plate elements supported upon said inner supporting structure each adjacent an opposite side face of said idler element and each having a clutch surface at an exterior side face thereof, a band of flexible material wrapped partially about said peripheral surface of the idler element and having a recessed face to receive said pulley structure, the recessed face thereof comprising a pair of laterally spaced-apart clutch surfaces facing toward each other and in overlying relation with the side clutch surfaces of the driving plate elements for coacting with said side clutch surfaces, and means for tensioning said band and forcing said clutch surfaces thereof into engagement with said side clutch surfaces to rotate said elements of the pulley structure together.

6. A band and pulley clutch assembly as defined in claim 5 in which said band includes a pair of laterally spaced-apart substantially inextensible tension elements embedded in said flexible material of the band at positions laterally outward of said clutch surfaces thereof respectively, and flexible tension-resisting material joining said tension elements laterally of the band to compel said tension elements to urge said clutch surfaces of the band toward each other and against said side clutch surfaces under the tendency of said tension elements to move radially inward of the pulley structure when tensioned thereon.

7. A band and pulley clutch assembly as defined in claim 5 in which one of said driving plate elements is supported upon said inner supporting structure in axially slidable relation therewith and with an interior face thereof adjacent an opposite side face of said idler element, whereby under said tensioning of the band the slidable driving plate element is pressed against said idler element at said opposite side face of the latter and the idler and driving plate elements are compelled to rotate together.

8. A band and pulley clutch assembly comprising a pulley structure including an idler element having a peripheral surface and opposite side clutch surfaces, an inner supporting structure on which said idler element is slidably mounted and freely rotatable, a pair of driving plate elements supported upon said inner supporting structure each having a clutch surface at the interior radial face thereof adjacent one of said side clutch surfaces of the idler element and each having a side clutch surface at an exterior face thereof, one of said driving plate elements being axially slidable relative to said inner supporting structure, a band comprising a flexible body of rubber-like material wrapped partially about said peripheral surface of the idler element and having a pair of laterally spaced-apart clutch surfaces facing toward each other for receiving said pulley structure between them, a pair of substantially inextensible tension elements embedded in said body at positions laterally outward of said clutch surfaces of the band respectively, and flexible tension-resisting material joining said tension elements laterally of the band to compel said tension elements to urge said clutch surfaces of the band toward each other under the tendency of said tension elements to move in the radially inward direction when tensioned about the pulley structure, and means for tensioning said band and forcing said clutch surfaces of the band into engagement with the exterior side clutch surfaces of said driving plate elements thereby pressing said driving plate elements and said idler element toward one another into engaged relation for rotating said elements of the pulley structure together.

9. A band and pulley clutch assembly comprising a pulley structure having a pair of axially aligned and axially separated band-engaging parts, said parts presenting axially spaced-apart clutch surfaces facing away from each other at exterior sides of the pulley structure and said pulley structure having a third part between said pair of band-engaging parts, at least one of said parts being mounted for free rotation relative to the other said parts, a band of flexible material on said parts of the pulley structure and having axially spaced-apart surfaces facing each other and adapted to coact with the side clutch surfaces of the band-engaging pulley parts, and means for tensioning said band on the pulley structure parts to force said surfaces of the band into driving engagement with said side clutch surfaces to compel rotation of said parts of said pulley structure together.

10. A band and pulley clutch assembly comprising a pulley structure having axially aligned and axially separated parts mounted for rotation, said parts presenting axially spaced-apart clutch surfaces facing away from each other at exterior sides of the pulley structure, a band of flexible material on said parts of the pulley structure and having axially spaced-apart surfaces facing each other and adapted to coact with the side clutch surfaces of said parts of the pulley structure, and means for tensioning said band on the pulley structure parts to force said surfaces of the band into driving engagement with said side clutch surfaces to compel rotation of said parts of said pulley structure together.

11. A band and pulley clutch assembly as defined in claim 10 in which said pulley structure includes clutch means between the axially separated parts of the pulley structure for effecting clutching engagement of said parts.

12. A band and pulley clutch assembly as defined in claim 10 in which said pulley structure includes a relatively rotatable third part between the axially separated parts of the pulley structure and clutch means at adjacent faces of the first said parts and said third part of the pulley structure for effecting clutching engagement of said parts of the latter structure, at least one of said axially separated parts being mounted for axial sliding movement with respect to said third part.

13. A band and pulley clutch assembly comprising axially aligned and relatively rotatable idler and torque-transmitting pulley elements in side-by-side relation, the idler element comprising a body having a peripheral cylindrical surface maintained by said body permanently at a constant radial distance from the axis of rotation of the element, a band of flexible material upon and engaging said cylindrical surface of the idler element and having a surface opposed to an engaging face of the torque-transmitting element and disengaged therefrom in the disengaged condition of the assembly, and means for tensioning said band to contract it radially upon the pulley and into driving engagement with said engaging face of the torque-transmitting element while said band remains in engagement with said cylindrical surface of the idler element.

14. A band and pulley clutch assembly comprising a band of flexible material having a circumferentially recessed inner face providing axially spaced-apart side face portions facing each other with an intermediate face portion therebetween, a pulley structure in the recess of said band along the wrapped extent and comprising axially aligned idler and torque-transmitting pulley elements mounted for rotation of the idler element relative to the torque-transmitting element, said idler element having a peripheral face in engagement with said intermediate face portion of said band, said torque-transmitting element having an exterior side clutch surface opposite one of said side face portions of said band in disengaged relation therewith in the disengaged condition of the clutch, and means for tensioning said band to force the latter said side face portion thereof in the axial direction into driving engagement with the side clutch surface of said torque-transmitting element while said band remains in engagement with said idler element.

15. A band and pulley clutch assembly comprising a pulley structure having axially aligned and axially separated relatively rotatable parts mounted in fixed relation one to the other axially of the pulley structure, one of said parts having an exterior side clutch surface facing away from the other part in the axial direction, a band of flexible material on the pulley structure in engagement with said other part thereof and having an overlying portion adjacent said clutch surface, and means for tensioning said band on the pulley structure to force a surface of said overlying portion of the band in the axial direction into engagement with the side clutch surface of the pulley structure while the band remains in engagement with said other part of said pulley structure.

16. A band and pulley clutch assembly comprising a pulley structure having axially aligned and axially separated relatively rotatable parts in the disengaged condition of the clutch, one of said parts being movable axially of the pulley structure with respect to the other part and one of said parts presenting a clutch surface at an exterior side of the pulley structure, a band of flexible material on said parts of the pulley structure having an overlying portion adjacent said clutch surface, clutching means between said parts, and means for tensioning said band on the pulley structure to force a surface of said overlying portion of the band in the axial direction into engagement with the side clutch surface of the pulley structure and urge said parts of the pulley structure axially toward one another to engage said clutching means.

17. A band and pulley clutch assembly comprising a pulley structure having axially aligned and relatively rotatable parts, and a band of flexible material upon said parts having a longitudinally recessed inner face providing axially spaced-apart portions in overlapping relation to opposite sides of the pulley structure along the wrapped extent, said band having a tension-resisting structure including tension-resisting elements extending longitudinally in the region of said portions to compel swinging of said portions axially toward each other into engagement with said pulley structure under tension of the band tending to contract said tension-resisting elements radially of said pulley structure.

18. A band and pulley clutch assembly comprising a pulley structure having axially aligned and relatively rotatable parts, and a band of flexible material upon said parts having a longitudinally recessed inner face providing a portion extending radially inward in overlapping relation to a side of the pulley structure along the wrapped extent, said portion of the band having an engaging surface adjacent said side of the pulley structure, said band having a tension-resisting structure including a tension-resisting element extending longitudinally in the region of said portion to compel swinging of said portion and said engaging surface thereof into engagement with the side of said pulley structure under tension of the band upon said pulley structure tending to contract said tension-resisting element in the radial direction.

CHARLES O. SLEMMONS.

REFERENCES CITED

The following references are of record in the file of this patent:

UNITED STATES PATENTS

| Number | Name | Date |
|---|---|---|
| 1,431,376 | Davis | Oct. 10, 1922 |
| 1,822,935 | Reeves | Sept. 15, 1931 |
| 2,031,319 | Kahn | Feb. 18, 1936 |